3,461,132
NOVEL TIN COMPLEXES

Ludwig Schröder, Klaus Thomas, and Dietrich Jerchel, Ingelheim am Rhein, Germany, assignors to C. H. Boehringer Sohn, Ingelheim am Rhein, Germany, a limited partnership
No Drawing. Filed Aug. 11, 1965, Ser. No. 478,997
Claims priority, application Germany, Aug. 20, 1964, B 78,197
Int. Cl. C07f 7/22; C07d 65/18, 63/10
U.S. Cl. 260—327  27 Claims

ABSTRACT OF THE DISCLOSURE

Tin complexes of the formula

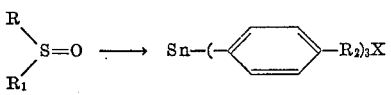

wherein

X is an anion of an acid selected from the group consisting of organic and inorganic acids, R and $R_1$ are selected from the group consisting of aliphatic hydrocarbon radicals of 1 to 6 carbon atoms, aromatic and araliphatic radicals whose aromatic rings may be substituted with at least one substituent selected from the group consisting of halogen, nitro, alkyl, alkoxy, acyloxy, mono- and dialkylamino and R and $R_1$ together with the sulfur atom represent a saturated or unsaturated, mono- or polynuclear ring which may contain a further heteroatom, and $R_2$ is selected from the group consisting of hydrogen or halogen.

The invention also relates to pesticides and their use.

The tin complexes of Formula I possess an excellent antimicrobic activity, particularly bacteriostatic and fungistatic activity with little or no phytotoxicity, and an algicidal and molluscidal activity. For example, they are effective against *Staphylococcus aureus* SG 511, *Canad. albicans*, *Asperg. niger*, etc. They are useful for protecting plants against infection such as *Phytophthora infestans* or *Cercospora beticula*, or as impregnating agents for textiles, synthetics, paints, ship-bottoms, etc., and may be used with known antimicrobic agents to increase their selectivity, their effective breadth and/or their compatibility.

OBJECTS OF THE INVENTION

It is an object of the invention to provide novel tin complexes of Formula I.

It is another object of the invention to provide a novel process for the preparation of the tin complexes of Formula I.

It is an additional object of the invention to provide novel pesticide compositions wherein the active agent is at least one tin complex of Formula I.

It is a further object of the invention to provide a novel method of protecting plants from fungus.

These and other objects and advantages of the invention will become obvious from the following detailed description.

THE INVENTION

The novel tin complexes of the invention have the formula

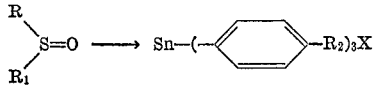

wherein

X is an anion of an acid selected from the group consisting of organic and inorganic acids, R and $R_1$ are selected from the group consisting of aliphatic hydrocarbon radical of 1 to 6 carbon atoms, aromatic and araliphatic radicals whose aromatic rings may be substituted with at least one substituent selected from the group consisting of halogen, nitro, alkyl, alkoxy, acyloxy, mono- and dialkylamino and R and $R_1$ together with the sulfur atom represent a saturated or unsaturated, mono- or polynuclear ring which may contain a further heteroatom, and $R_2$ is selected from the group consisting of hydrogen or halogen.

The said complexes are derivatives of penta-coordinated tin as can be evidenced from their physical properties. Thus, S=O oscillation in the infrared spectrum shows by a long wave shifting of about 70 wave numbers the formation of the complex, since it indicates the intensive stress of the bonding electrons of the S=O bond.

Particularly prefered complexes of Formula I are ones in which

X is selected from the group consisting of halogen and thiocyano, $R_2$ is selected from the group consisting of hydrogen and chlorine and R and $R_1$ are selected from alkyl and alkenyl of 1 to 6 carbon atoms, phenyl and phenyl lower alkyl which may be substituted with at least one substituent selected from the group consisting of halogen, lower alkyl, lower alkoxy, nitro, lower alkanoyloxy and mono- and di-lower alkylamino and R and $R_1$ together with the sulfinyl group form a heterocycle selected from the group consisting of thioxane-S-oxide, butylene sulfoxide and diphenylene sulfoxide.

The novel process for the preparation of the tin complexes of Formula I comprises reacting a sulfoxide of the formula

  II wherein R and $R_1$ have the above definitions with a triaryl tin salt of the formula

  III wherein $R_2$ and X have the above definitions.

The reaction is preferably conducted at room temperature or at slightly elevated temperatures, advantageously by using equivalent amounts of the starting substances, in an inert solvent such as, for example, methylene chloride, ethylene chloride, ether, methanol, ethanol, chloroform, dioxane, dimethylformamide, acetonitrile, acetone, etc. After evaporation of the solvent, the complex may be purified by recrystallization.

The novel pesticide compositions of the invention are comprised of at least one tin complex of the formula

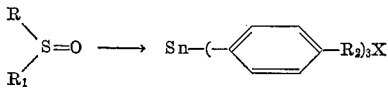  I wherein

X is an anion of an acid selected from the group consisting of organic and inorganic acids, R and $R_1$ are selected from the group consisting of aliphatic hydrocarbon radical of 1 to 6 carbon atoms, aromatic and araliphatic radicals whose aromatic rings may be substituted with at least one substituent selected from the group consisting of halogen, nitro, alkyl, alkoxy, acyloxy, mono- and dialkylamino and R and $R_1$ together with the sulfur atom represent a saturated or unsaturated, mono- or polynuclear ring which may contain a further heteroatom, and $R_2$ is selected from the group consisting of hydrogen or halogen, and an inert carrier.

The said compositions may be prepared in the form of dusting preparations or solutions, emulsions or dispersions, etc.

In order to prepare a solution suitable for direct spraying there may be used, for example, a mineral oil fraction of high or medium boiling range, such as diesel oil or kerosene, or coal tar oils, or vegetable or animal oils and also hydrocarbons such as alkylated naphthalenes, or tetrahydronaphthalene, if desired, with the use of xylene mixtures, cyclohexanols, ketones, or chlorinated hydrocarbons, such as tetrachlorethane, trichlorethylene or tri- or tetrachlorobenzenes.

Aqueous preparations suitable for application can be prepared by the addition of water to emulsion concentrates, pastes or wettable powders. As emulsifying or dispersion agents there may be used non-ionic products, for example, condensation products of ethylene oxide with aliphatic alcohols, amines or carboxylic acids containing a hydrocarbon radical having about 10 to 30 carbon atoms, such as a condensation product of octadecyl alcohol with 25 to 30 molecular proportions of ethylene oxide, or of soya bean fatty acid with 30 molecular proportions of ethylene oxide or of commercial oleylamine with 15 molecular proportions of ethylene oxide or of dodecyl-mercaptan with 12 molecular proportions of ethylene oxide. Among anion active emulsifying agents there may be mentioned the sodium salt of dodecyl alcohol sulfuric acid ester, the sodium salt of dodecyl-benzene sulfonic acid, the potassium or triethanolamine salt of oleic acid or abietic acid or of a mixture of these acids, or the sodium salt of petroleum-sulfonic acid.

For making dusting or scattering preparations there may be used as solid carriers talcum, kaolin, bentonite, calcium carbonate or calcium phosphate or carbon, cork meal or wood meal or other materials of vegetable origin. The various preparations can be rendered more suitable for the various ways in which they are to be used by the known addition of substances which improve the dispersion, adhesiveness, resistance to rain or penetration capacity of the compositions. As such substances there may be mentioned fatty acids, resins, glue, casein or, for example, alginates or the like.

The novel method of the invention for protecting plants from fungi comprises contacting the plants with an effective fungicidal amount of at least one tin complex of the formula

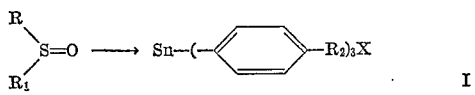

I wherein

X is an anion of an acid selected from the group consisting of organic and inorganic acids, R and $R_1$ are selected from the group consisting of aliphatic hydrocarbon radicals of 1 to 6 carbon atoms, aromatic and araliphatic radicals whose aromatic rings may be substituted with at least one substituent selected from the group consisting of halogen, nitro, alkyl, alkoxy, acyloxy, mono- and dialkylamino and R and $R_1$ together with the sulfur atom represent a saturated or unsaturated, mono- or polynuclear ring which may contain a further heteroatom, and $R_2$ is selected from the group consisting of hydrogen or halogen.

In the following examples there are described several preferred embodiments to illustrate the invention. However, it should be understood that the invention is not intended to be limited to the specific embodiments.

Example 1

7.8 gm. (0.1 mol) of dimethylsulfoxide were dissolved in 50 ml. of methanol and combined with a solution of 38.5 gm. (0.1 mol) of triphenyl-tin-chloride in 100 ml. of methanol. The solvent was evaporated, and the residue was recrystallized from isopropanol to obtain 40.2 gm. (87% yield) of dimethylsulfinyl-triphenyl-chlorostannate having a melting point of 114.5° C.

Example 2

Using the procedure of Example 1, triphenyl tin chloride was reacted with butylenesulfoxide to obtain a 72% yield of butylene-sulfinyl-triphenyl-chlorostannate having a melting point of 113–114° C.

Example 3

Using the procedure of Example 1, triphenyl tin chloride was reacted with thioxanesulfoxide to obtain a 64% yield of thioxane-sulfinyl-triphenyl-chlorostannate having a melting point of 116-117° C.

Example 4

Using the procedure of Example 1, triphenyl tin chloride was reacted with diphenylenesulfoxide to obtain a 83% yield of diphenylene-sulfinyl-triphenyl-chlorostannate having a melting point of 138–139° C.

Example 5

Using the procedure of Example 1, triphenyl tin chloride was reacted with diphenylsulfoxide to obtain a 87% yield of diphenylsulfinyl-triphenyl-chlorostannate having a melting point of 102–104° C.

Example 6

Using the procedure of Example 1, triphenyl tin chloride was reacted with dibenzylsulfoxide to obtain a 32% yield of dibenzylsulfinyl-triphenyl-chlorostannate having a melting point of 91° C.

Example 7

Using the procedure of Example 1, triphenyl tin thiocyanide was reacted with dimethylsulfoxide to obtain a 62.5% yield of dimethylsulfinyl-triphenyl-thiocyano-stannate having a melting point of 147–150° C.

Example 8

Using the procedure of Example 1, triphenyl tin thiocyanide was reacted with diethylsulfoxide to obtain a 75% yield of diethylsulfinyl-triphenyl-thiocyano-stannate having a melting point of 111–112° C.

Example 9

Using the procedure of Example 1, triphenyl tin thiocyanide was reacted with diphenylsulfoxide to obtain a 67% yield of diphenylsulfinyl-triphenyl-thiocyano-stannate having a melting point of 117–119° C.

Example 10

Using the procedure of Example 1, triphenyl tin chloride was reacted with benzylphenylsulfoxide to obtain a 63.5% yield of benzylphenylsulfinyl-triphenyl-chlorostannate having a melting point of 102° C.

Example 11

Using the procedure of Example 1, triphenyl tin chloride was reacted with phenylallylsulfoxide to obtain a 70% yield of phenylallylsulfinyl-triphenyl-chlorostannate having a melting point of 89–90° C.

Example 12

Using the procedure of Example 1, triphenyl tin chloride was reacted with phenylpropylsulfoxide to obtain a 68% yield of phenylpropylsulfinyl-triphenyl-chlorostannate having a melting point of 81–83° C.

Example 13

Using the method of Example 1, triphenyl tin chloride was reacted with phenylethylsulfoxide to obtain a 67% yield of phenylethylsulfinyl-triphenyl-chlorostannate having a melting point of 90–93° C.

Example 14

Using the procedure of Example 1, triphenyl tin chloride was reacted with diethylsulfoxide to obtain a yield of 65% of diethylsulfinyl-triphenyl-chlorostannate having a melting point of 115–117° C.

Example 15

Using the procedure of Example 1, triphenyl tin chloride was reacted with phenyl-n-hexylsulfoxide to obtain a 70.6% yield of phenyl-n-hexylsulfinyl-triphenyl-chlorostannate having a melting point of 93–97° C.

Example 16

Using the procedure of Example 1, triphenyl tin chloride was reacted with p-chlorophenyl-n-butylsulfoxide to obtain a 68% yield of p-chlorophenyl-n-butylsulfinyl-triphenyl-chlorostannate having a melting point of 81–82° C.

Example 17

Using the procedure of Example 1, tri-p-chlorophenyl tin chloride was reacted with dimethylsulfoxide to obtain a 50% yield of dimethylsulfinyl-tri-p-chlorophenyl-chlorostannate having a melting point of 121–122° C.

Example 18

Using the procedure of Example 1, triphenyl tin chloride was reacted with di-(p-methylphenyl)sulfoxide to obtain a 81:5% yield of di-p-methylphenylsulfinyl-triphenyl-chlorostannate having a melting point of 106–108° C.

Example 19

Using the procedure of Example 1, triphenyl tin chloride was reacted with di-(2-chloro-4-methylphenyl)sulfoxide to obtain a 69% yield of di-(2-chloro-4-methylphenyl)-sulfinyl-triphenyl-chlorostannate having a melting point of 97–100° C.

Example 20

Using the procedure of Example 1, triphenyl tin chloride was reacted with di-(4-methoxyphenyl)sulfoxide to obtain a 70.5% yield of di-4-methoxyphenylsulfinyl-triphenyl-chlorostannate having a melting point of 105–107° C.

Example 21

Using the procedure of Example 1, triphenyl tin chloride was reacted with di-(2-methyl-4-chloro-5-methylphenyl)sulfoxide to obtain a 84% yield of di-(2-methyl-4 - chloro - 5 - methylphenyl) - sulfinyl - triphenyl - chlorostannate having a melting point of 139–142° C.

Example 22

Using the procedure of Example 1, triphenyl tin chloride was reacted with di-(4-diethylaminophenyl)sulfoxide to obtain a 55% yield of di-(4-diethylaminophenyl)-sulfinyl-triphenyl-chlorostannate having a melting point of 93–96° C.

Example 23

Using the procedure of Example 1, triphenyl tin chloride was reacted with di-(4-dimethylaminophenyl)sulfoxide to obtain a 84% yield of di-(4-dimethylaminophenyl)sulfinyl-triphenyl-chlorostannate having a melting point of 149–150° C.

Example 24

Using the procedure of Example 1, triphenyl tin chloride was reacted with di-(4-acetoxyphenyl)sulfoxide to obtain a 65% yield of di-(4-acetoxyphenyl)sulfinyl-triphenyl-chlorostannate having a melting point of 130–133° C.

Example 25

Using the procedure of Example 1, triphenyl tin chloride was reacted with di-(4-methylaminophenyl)sulfoxide to obtain a 76.5% yield of di-(4-methylaminophenyl)-sulfinyl-triphenyl-chlorostannate having a melting point of 130–133° C.

Example 26

Using the procedure of Example 1, triphenyl tin chloride was reacted with phenylisopropylsulfoxide to obtain a 55% yield of phenylisopropylsulfinyl-triphenyl-chlorostannate having a melting point of 88–95° C.

Example 27

For agricultural fungicides, the compositions can be prepared as a 20% wettable consisting of, for example, 20% of di-(2-chloro-4-methylphenyl)sulfinyl-triphenyl-chlorostannate, 71.5% of kaolin, 5% of calcium lignosulfonate, 2% of an alkali metal naphthalene sulfonate and 15% of methyl cellulose.

Example 28

The compositions can also be prepared as a 50% wettable powder for agricultural fungicide usage. An example of such a powder is 50% of di-(2-chloro-4-methylphenyl) sulfinyl-triphenyl-chlorostannate, 33% of kaolin, 9% of calcium lignosulfonate, 5% of an alkali metal salt of naphthalene sulfonate and 3% of methyl cellulose.

Various modifications of the compositions and process of the invention may be made without departing from the spirit or scope thereof, and it is to be understood that the invention is to be limited only as defined in the appended claims.

We claim:

1. A tin complex of the formula

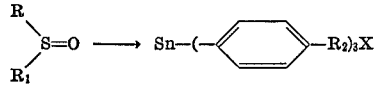

wherein

X is selected from the group consisting of halogen and thiocyano, $R_2$ is selected from the group consisting of hydrogen and chlorine and R and $R_1$ are selected from alkyl and alkenyl of 1 to 6 carbon atoms, phenyl and phenyl lower alkyl which may be substituted with at least one substituent selected from the group consisting of halogen, lower alkyl, lower alkoxy, nitro, lower alkanoyloxy and mono- and di-lower alkylamino and R and $R_1$ together with the sulfinyl group form a heterocycle selected from the group consisting of thioxane S-oxide, butylene sulfinyl and diphenylene sulfinyl.

2. A tin complex of claim 1 wherein X is chloro.
3. Dimethylsulfinyl-triphenyl-chlorostannate.
4. Di - (4 - methoxyphenyl)sulfinyl - triphenyl - chlorostannate.
5. Di - (2 - chloro - 4 - methyl - phenyl)sulfinyl - triphenylchloro-stannate.
6. Diphenylsulfinyl-triphenyl-chlorostannate.
7. Butylenesulfinyl-triphenyl-chlorostannate.
8. Dibenzylsulfinyl-triphenyl-chlorostannate.
9. Thioxanesulfinyl-triphenyl-chlorostannate.
10. Dimethylsulfinyl-triphenyl-thiocyanostannate.
11. Diethylsulfinyl-triphenyl-thiocyanostannate.
12. Diphenylsulfinyl-triphenyl-thiocyanostannate.
13. Benzylphenylsulfinyl-triphenyl-chlorostannate.
14. Phenylallylsulfinyl-triphenyl-chlorostannate.
15. Phenylpropylsulfinyl-triphenyl-chlorostannate.
16. Phenylethysulfinyl-triphenyl-chlorostannate.
17. Diethylsulfinyl-triphenyl-chlorostannate.

18. Phenyl - n - hexylsulfinyl - triphenyl - chlorostannate.
19. p - Chlorophenyl - n - butylsulfinyl - triphenyl-chlorostannate.
20. Dimethylsulfinyl - tri - p - chlorophenyl - chlorostannate.
21. Di - p - methylphenylsulfinyl - triphenyl - chlorostannate.
22. Di - (2 - methyl - 4 - chloro - 5 - methylphenyl)-sulfinyl-triphenyl-chlorostannate.
23. Di - (4 - diethylamino - phenyl) - sulfinyl - triphenyl-chlorostannate.
24. Di - (4 - dimethylaminophenyl) - sulfinyl - triphenyl-chlorostannate.
25. Di - (4 - acetoxyphenyl) - sulfinyl - triphenyl-chlorostannate.
26. Di - (4 - methylaminophenyl) - sulfinyl - triphenyl-chlorostannate.
27. Phenylisopropylsulfinyl - triphenyl - chlorostannate.

References Cited
UNITED STATES PATENTS 2,777,874   1/1957   Asseff _____ 260—504

JAMES A. PATTEN, Primary Examiner

U.S. Cl. X.R.

424—288; 260—329, 429